United States Patent
Tanno et al.

(10) Patent No.: US 8,945,322 B2
(45) Date of Patent: *Feb. 3, 2015

(54) METHOD OF PRODUCING A PNEUMATIC TIRE WITH A SURFACE FASTENER

(75) Inventors: Atsushi Tanno, Hiratsuka (JP); Shiro Ogawa, Osaka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1432 days.

This patent is subject to a terminal disclaimer.

(21) Appl. No.: 12/530,707

(22) PCT Filed: Apr. 14, 2008

(86) PCT No.: PCT/JP2008/057301
§ 371 (c)(1),
(2), (4) Date: Aug. 17, 2011

(87) PCT Pub. No.: WO2008/133093
PCT Pub. Date: Nov. 6, 2008

(65) Prior Publication Data
US 2011/0290395 A1    Dec. 1, 2011

(30) Foreign Application Priority Data

Apr. 25, 2007  (JP) ................................. 2007-115963

(51) Int. Cl.
*B29D 30/06*    (2006.01)
*B60C 19/00*    (2006.01)

(52) U.S. Cl.
USPC ........................................ 156/110.1; 152/450

(58) Field of Classification Search
None
See application file for complete search history.

(56) References Cited

U.S. PATENT DOCUMENTS

| 3,712,362 | A |   | 1/1973  | Alderfer |
|-----------|---|---|---------|----------|
| 4,094,354 | A |   | 6/1978  | Ferrell et al. |
| 4,105,487 | A |   | 8/1978  | Suzuki et al. |
| 4,202,392 | A |   | 5/1980  | Mineur et al. |
| 5,085,942 | A |   | 2/1992  | Hong et al. |
| 5,380,384 | A |   | 1/1995  | Tokunaga et al. |
| 5,573,611 | A | * | 11/1996 | Koch et al. ................. 152/152.1 |
| 6,475,319 | B1 |  | 11/2002 | Akiyama |
| 6,792,986 | B2 |  | 9/2004  | Allen et al. |
| 7,052,565 | B2 |  | 5/2006  | Seth |

(Continued)

FOREIGN PATENT DOCUMENTS

| JP |   61189909    | * | 8/1986 |
| JP | A 2002-214060 |   | 7/2002 |

(Continued)

OTHER PUBLICATIONS

Machine Generated English Translation of JP 2006-044503, 2006.

(Continued)

*Primary Examiner* — Justin Fischer
(74) *Attorney, Agent, or Firm* — Greer, Burns & Crain, Ltd.

(57) ABSTRACT

A method of producing a pneumatic tire with a surface fastener including filling an uncured rubber between engagement elements of a surface fastener to form a protective rubber layer in which the engagement elements are buried; placing the surface fastener having the protective rubber layer on an uncured tire in a manner that a surface of the surface fastener opposite a surface having the engagement elements is in intimate contact with an inner surface of the tire; and curing the uncured tire having the surface fastener by use of a curing machine equipped with a bladder.

8 Claims, 5 Drawing Sheets

(56) References Cited

U.S. PATENT DOCUMENTS

| | | |
|---|---|---|
| 7,125,400 B2 | 10/2006 | Igaue et al. |
| 2002/0022108 A1 | 2/2002 | Krantz et al. |
| 2002/0093422 A1 | 7/2002 | Shimura |
| 2003/0155054 A1* | 8/2003 | Bell .............................. 152/151 |
| 2004/0006854 A1 | 1/2004 | Simon |
| 2004/0103967 A1 | 6/2004 | Majumdar et al. |
| 2006/0117537 A1 | 6/2006 | Provost et al. |
| 2006/0164250 A1 | 7/2006 | Kawai |
| 2011/0290395 A1 | 12/2011 | Tanno et al. |

FOREIGN PATENT DOCUMENTS

| | | |
|---|---|---|
| JP | A 2004-163134 | 6/2004 |
| JP | A 2005-517581 | 6/2005 |
| JP | A 2006-44503 | 2/2006 |
| JP | A 2007-22043 | 2/2007 |
| JP | 2008-272954 | 11/2008 |
| WO | WO 2005/021292 A1 | 3/2005 |

OTHER PUBLICATIONS

Office Action issued in U.S. Appl. No. 12/447,648 on Dec. 20, 2011.
Office Action issued in U.S. Appl. No. 12/447,648 dated Sep. 4, 2012.
Office Action issued in U.S. Appl. No. 12/447,648 dated Mar. 26, 2013.
Office Action issued in U.S. Appl. No. 12/334,017 dated Jan. 24, 2012.
U.S. Appl. No. 12/334,017, filed Dec. 12, 2008.
U.S. Appl. No. 13/898,006, filed May 20, 2013.
U.S. Appl. No. 12/447,648, filed Apr. 28, 2008.
U.S. Appl. No. 13/585,510, filed Aug. 14, 2012.

* cited by examiner

METHOD OF PRODUCING A PNEUMATIC TIRE WITH A SURFACE FASTENER

This application is a U.S. National Phase under 35 U.S.C. §371 of International Application No. PCT/JP2008/057301, filed Apr. 14, 2008.

TECHNICAL FIELD

The present invention relates to: a pneumatic tire with a surface fastener (i.e. a pressure sensitive hook and loop fastener) which facilitates attachment of an auxiliary object such as a noise absorbing member; and a method of producing such a pneumatic tire. More specifically, the present invention relates to: a pneumatic tire with a surface fastener having engagement elements (i.e. hook-like fastening elements) that are prevented from being crushed during curing; and a method of producing such a pneumatic tire.

BACKGROUND ART

In order to facilitate attachment of an auxiliary object such as a noise absorbing member, proposed is a pneumatic tire including a surface fastener on the tire inner surface (see, for example, Patent Document 1). In practice, a noise absorbing member is placed in a cavity portion of a pneumatic tire to reduce a resonance sound generated in the cavity portion. The pneumatic tire with the surface fastener allows the auxiliary object such as a noise absorbing member to be attached or detached easily as needed.

Now, suppose a case where an uncured tire is built in which a surface fastener is pasted on the tire inner surface. In this case, however, when the uncured tire including the surface fastener is cured by a general curing machine equipped with a bladder, an engagement element of the surface fastener is sometimes crushed by a pressure of the bladder during curing. If the engagement element is crushed, the auxiliary object such as a noise absorbing member is attached in an unstable state, which may cause a problem that the attachment cannot be accomplished in some cases.

Patent Document 1: Japanese patent application Kokai publication No. 2006-44503

DISCLOSURE OF THE INVENTION

Problem to be Solved by the Invention

An object of the present invention is to provide: a pneumatic tire with a surface fastener having engagement elements that are prevented from being crushed during curing; and a method of producing such a pneumatic tire.

Means for Solving the Problem

The method of producing a pneumatic tire with a surface fastener of the present invention to achieve the above object is characterized as follows. An uncured rubber is filled between engagement elements of a surface fastener to form a protective rubber layer in which the engagement elements are buried. The surface fastener having the protective rubber layer is placed on an uncured tire in a manner that a surface of the surface fastener opposite a surface having the engagement elements is in intimate contact with an inner surface of the tire. The uncured tire having the surface fastener is cured by a curing machine equipped with a bladder.

Effects of the Invention

In the present invention, while an uncured tire having a surface fastener is cured by a curing machine equipped with a bladder, a protective rubber layer is stacked on the surface fastener in a manner that engagement elements are buried in the protective rubber layer. Accordingly, the engagement elements of the surface fastener can be prevented from being crushed by the pressure of the bladder during curing. After the tire is cured, the protective rubber layer is peeled off from the surface fastener as needed. This allows the attachment of any auxiliary object such as a noise absorbing member to the tire inner surface with the surface fastener.

In the present invention, before the surface fastener is placed on the uncured tire, the protective rubber layer is preferably cured in advance. This allows increase in the protection effect of the protective rubber layer on the engagement elements of the surface fastener.

The surface fastener is preferably a surface fastener having an anchor element on the surface opposite the surface having the engagement elements. When the surface fastener is placed on the uncured tire, the anchor element penetrates into the tire inner surface. This allows the surface fastener to be held firmly to the tire inner surface.

The protective rubber layer preferably has a trapezoid shape in a tire-meridian cross section, and has one surface which is in contact with the surface fastener, and which is larger than another surface opposite the one surface. To put it different, when a protective rubber layer is stacked on a surface, having engagement elements, of a surface fastener, air remains between a bladder and the tire inner surface due to a difference in level formed by the protective rubber layer. This may cause curing failure. However, the protective rubber layer having the cross-sectional shape as specified above can suppress the air remaining therebetween, and consequently prevent the curing failure.

The bladder which is inflated inside the uncured tire when the uncured tire is cured preferably has one portion which corresponds to the surface fastener and which has a thickness smaller than another portion surrounding the one portion. To put it differently, when a protective rubber layer is stacked on a surface, having engagement elements, of a surface fastener, heat generated during curing is conducted with difficulty to the tire side at a portion where the protective rubber layer exists. However, the bladder having the thickness as specified above allows preferable heat conduction at the portion where the protective rubber layer exists.

Before the surface fastener is placed on the uncured tire, a back-surface rubber layer is preferably pasted in advance on the surface of the surface fastener opposite the surface having the engagement elements, the back-surface rubber layer being made of an uncured rubber identical to that of an inner liner layer of the tire. This facilitates the pasting operation of the surface fastener on the tire inner surface. In this case, in the uncured tire before the surface fastener is placed, it is preferable that the inner liner layer be selectively thinned at a portion where the surface fastener is placed, or that the inner liner layer be selectively removed at the portion where the surface fastener is placed. Thereby, even when the back-surface rubber layer is stacked on the surface fastener, the thickness of the inner liner layer to which the thickness of the back-surface rubber layer is added is leveled. Consequently, uniform curing of the tire is achieved.

A releasing film is preferably pasted on a region of the surface, which is in contact with the surface fastener, of the protective rubber layer, the protective rubber layer protruding from the surface fastener in the region. This allows the protective rubber layer after subjected to the curing process to be prevented from being integrally pasted on the inner liner layer of the tire inner surface.

According to the present invention, a pneumatic tire with a surface fastener is obtained by the above-described production method. The pneumatic tire with a surface fastener is provided in which the protective rubber layer is attached to the surface fastener, or in which the protective rubber layer is removed from the surface fastener.

Specifically, the present invention provides a pneumatic tire with a surface fastener placed on an inner surface of the tire, and characterized as follows. A surface, having engagement elements, of the surface fastener is disposed opposite another surface thereof which is in contact with the tire inner surface. A protective rubber layer is filled between the engagement elements of the surface having the engagement elements.

Moreover, the present invention provides a pneumatic tire with a surface fastener placed on an inner surface of the tire, and characterized as follows. A surface, having engagement elements, of the surface fastener is disposed opposite another surface thereof which is in contact with the tire inner surface. A protective rubber layer filled between the engagement elements of the surface having the engagement elements during a production of the tire is removed after the production of the tire.

When the tire is shipped with the surface fastener being attached to the protective rubber layer, it is possible to surely prevent a foreign substance such as a thread from attaching to the surface fastener, and to favorably maintain the engagement force of the surface fastener, by keeping the protective rubber layer attached to the surface fastener immediately before an auxiliary object such as a noise absorbing member is attached to the surface fastener. On the other hand, the tire can be shipped with the protective rubber layer being removed from the surface fastener and with an auxiliary object such as a noise absorbing member being attached to the surface fastener.

Figure 1:
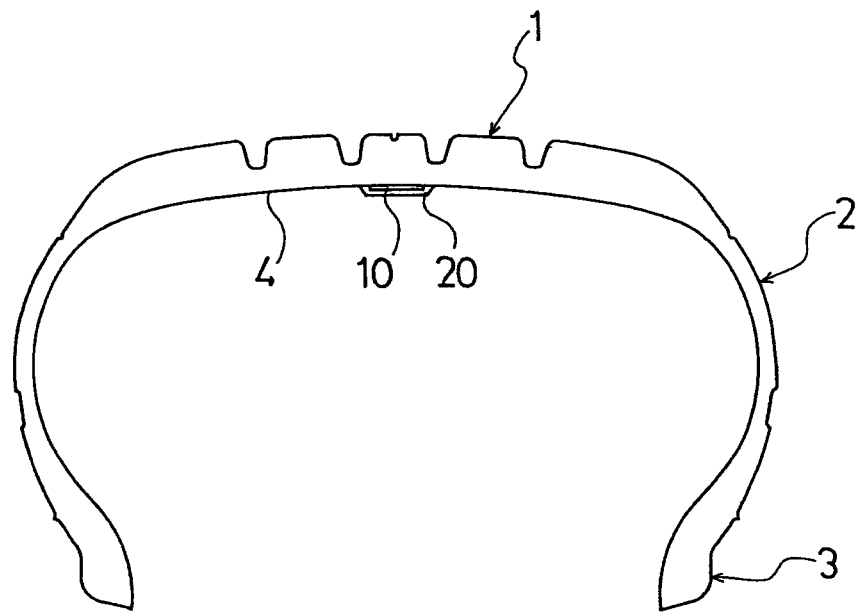
FIG. 1 is a meridian cross-sectional view showing a pneumatic tire with a surface fastener according to an embodiment of the present invention.

EXPLANATION OF REFERENCE NUMERALS 1 tread portion
2 sidewall portion
3 bead portion
4 tire inner surface
5 inner liner layer
6 carcass layer
10 surface fastener
11 engagement element
12 anchor element
20 protective rubber layer
30 back-surface rubber layer
40 releasing film

BEST MODES FOR CARRYING OUT THE INVENTION

Hereinafter, a structure of the present invention will be described in detail with reference to the attached drawings. FIG. 1 shows a pneumatic tire with a surface fastener according to an embodiment of the present invention. In FIG. 1, reference numeral 1 denotes a tread portion, reference numeral 2 denotes a sidewall portion, and reference numeral 3 denotes a bead portion. In the central region of the tread portion 1, a surface fastener 10 and a protective rubber layer 20 covering the surface fastener 10 are mounted on a tire inner surface 4. The surface fastener 10 and the protective rubber layer 20 may be disposed continuously all over the tire circumference, or may be disposed intermittently in a tire circumferential direction. The protective rubber layer 20 can be stripped off from the surface fastener 10. Accordingly, in a state where the surface fastener 10 is exposed by removing the protective rubber layer 20 therefrom, any auxiliary object such as a noise absorbing member, weight, temperature sensor and pressure sensor are attachable to the surface fastener 10.

Figure 2:
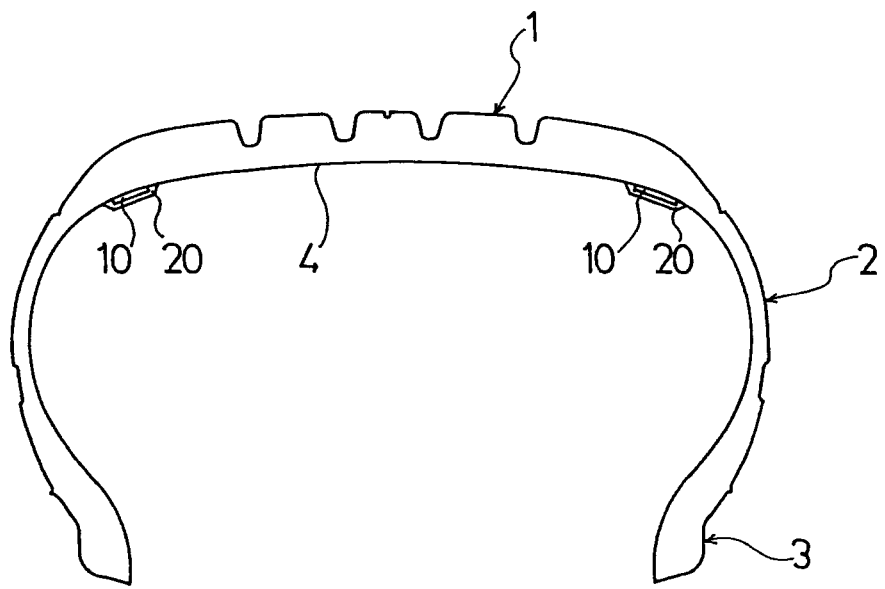
FIG. 2 is a meridian cross-sectional view showing a pneumatic tire with a surface fastener according to another embodiment of the present invention.

Note that the position of the surface fastener 10 is not limited to the central region of the tread portion 1. It is possible to select shoulder regions of the tread portion 1 as shown in FIG. 2, or select the sidewall portion 2 or the bead portion 3.

Next, a method of producing the above-described pneumatic tire with a surface fastener will be described. Each of FIGS. 3 to 11 illustrates such a method of producing a pneumatic tire with a surface fastener of the present invention. These FIGS. 3 to 11 show an extracted tire-meridian cross section of a portion around the surface fastener.

Figure 3:
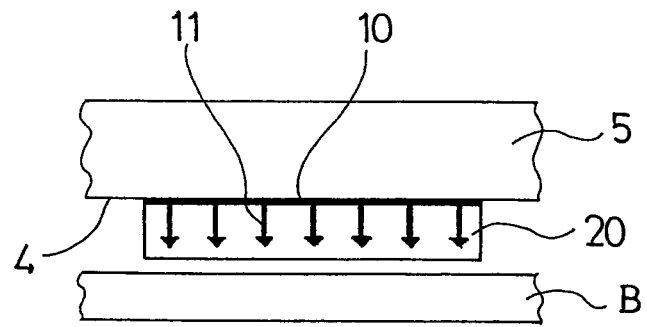
FIG. 3 is a cross-sectional view showing one example of a tire-meridian cross section of a portion around a surface fastener in a method of producing a pneumatic tire with a surface fastener according to the present invention.

FIG. 3 shows a state where a surface fastener 10 and a protective rubber layer 20 pasted on a tire inner surface 4 (i.e., inner surface of an inner liner layer 5) are to be pressed by a bladder B. The surface fastener 10 has multiple engagement elements 11 on one surface thereof.

When the above-described pneumatic tire is to be produced, an uncured rubber is filled between the engagement elements 11 of the surface fastener 10 to form the protective rubber layer 20 in which the engagement elements 11 are buried. Then, the surface fastener 10 having the protective rubber layer 20 is placed on an uncured tire in a manner that a surface of the surface fastener 10 opposite the surface having the engagement elements is in intimate contact with the tire inner surface 4. After that, the uncured tire having the surface fastener 10 is cured by a curing machine equipped with the bladder B. Simultaneously, the surface fastener 10 is adhered to the tire inner surface 4 by the curing.

While the uncured tire including the surface fastener 10 is cured by the curing machine equipped with the bladder B in this manner, the protective rubber layer 20 is stacked on the surface fastener 10 in a manner that the engagement elements 11 are buried in the protective rubber layer 20. Thereby, the engagement elements 11 of the surface fastener 10 can be prevented from being crushed by the pressure of the bladder B during curing.

When the protective rubber layer 20 is cured in advance before the surface fastener 10 is placed on the uncured tire, this allows increase in the protection effect of the protective rubber layer 20 on the engagement elements 11 of the surface fastener 10. It is needless to say that the surface fastener 10 can be placed on the uncured tire with the protective rubber layer 20 being uncured.

As the surface fastener 10, a surface fastener made of, for example, a resin mold body can be used. Although nylon and polyester can be used as the molding material, a nylon excellent in heat resistance is preferably used. Examples of the nylon include 6-nylon, 66-nylon, and a nylon copolymer of 6-nylon and 66-nylon. The shape and type of the surface fastener 10 are not particularly limited. The height of the engagement element 11 is preferably 0.5 mm or greater but lower than 2 mm, and thereby the engagement effect is improved. Additionally, the engagement elements 11 of the surface fastener 10 may be subjected to surface treatment with a releasing agent so as to reduce the adhesiveness to the protective rubber layer 20. Meanwhile, the material of the protective rubber layer 20 to be selected preferably has a low adhesiveness to the engagement elements 11 of the surface fastener 10. The example includes acrylonitrile-butadiene copolymer rubber (NBR).

Figure 4:
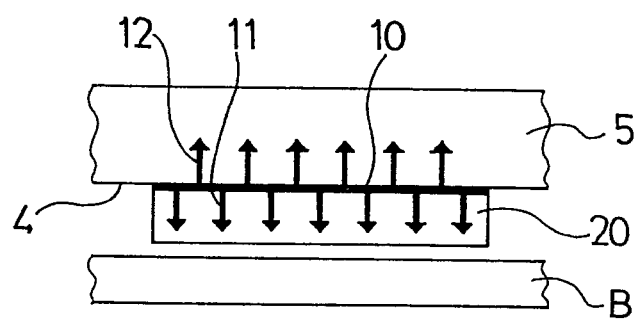
FIG. 4 is a cross-sectional view showing one example of the tire-meridian cross section of the portion around the surface fastener in the method of producing a pneumatic tire with a surface fastener according to the present invention.

In FIG. 4, a surface fastener 10 has multiple engagement elements 11 on one surface thereof, and multiple anchor elements 12 on the other surface. In this case, when the surface fastener 10 is placed on an uncured tire, the anchor elements 12 penetrate into a tire inner surface 4. This allows the surface fastener 10 to be held firmly to the tire inner surface 4. The anchor element 12 preferably has an enlarged portion at its tip end. The width of the enlarged portion is preferably 0.3 mm or wider but narrower than 1 mm. When the width of the enlarged portion of the anchor element 12 is set at to least 0.3 mm, the anchoring effect is increased. Meanwhile, if the width is 1 mm or wider, the penetration into the rubber becomes difficult.

Figure 5:
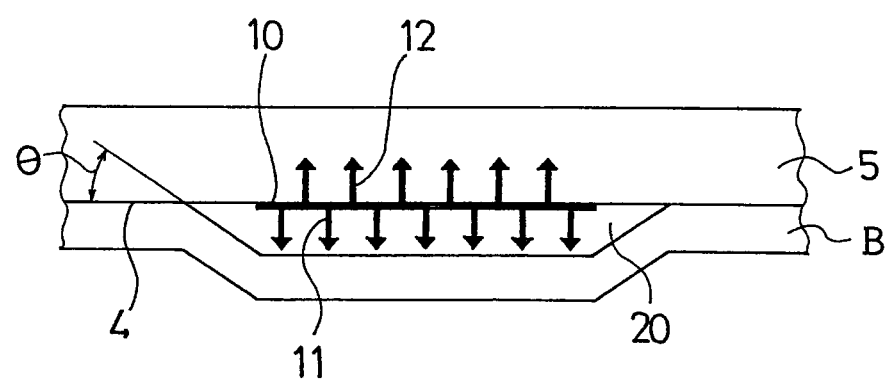
FIG. 5 is a cross-sectional view showing one example of the tire-meridian cross section of the portion around the surface fastener in the method of producing a pneumatic tire with a surface fastener according to the present invention.

In FIG. 5, a protective rubber layer 20 has a trapezoidal shape in the tire-meridian cross section. The protective rubber layer 20 has: a surface which is in contact with a surface fastener 10; and a surface on the opposite side. The former surface is larger than the latter surface. For example, when the protective rubber layer 20 having a rectangular shape in the cross section as shown in FIGS. 3 and 4 is stacked on the surface, having the engagement elements, of the surface fastener 10, air remains between a bladder B and a tire inner surface 4 due to a difference in level formed by the protective rubber layer 20. This may cause curing failure. However, when the protective rubber layer 20 having the trapezoid shape in the cross section as shown in FIG. 5 is stacked on the surface, having engagement elements, of the surface fastener 10, the air remaining therebetween is suppressed, and consequently the curing failure is prevented. The protective rubber layer 20 preferably has an acute-angle part which is shaped to have an angle θ between 5° to 45° in the tire-meridian cross section. By setting this angle θ to 45° or lower, the effect of suppressing the remaining air is sufficiently exerted.

Figure 6:
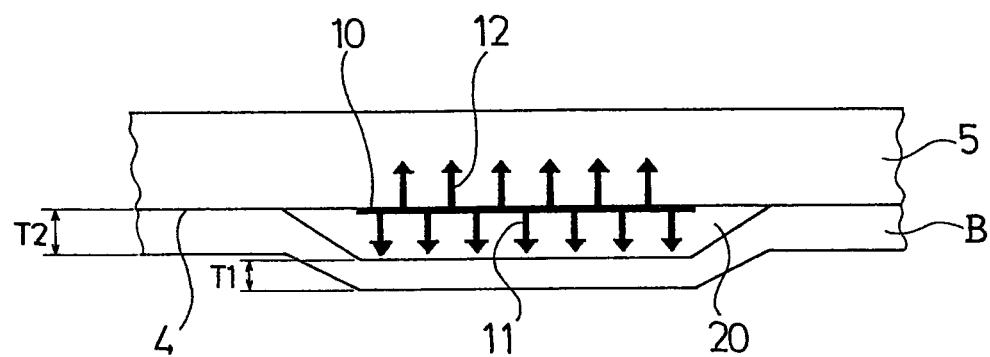
FIG. 6 is a cross-sectional view showing one example of the tire-meridian cross section of the portion around the surface fastener in the method of producing a pneumatic tire with a surface fastener according to the present invention.

In FIG. 6, a bladder B which is inflated inside an uncured tire when the uncured tire is cured has: a thickness T1 at a portion corresponding to a surface fastener 10; and a thickness T2 at the surrounding portions thereof. The thickness T1 is smaller than the thickness T2. When a protective rubber layer 20 is stacked on a surface, having engagement elements, of the surface fastener 10, heat generated during curing is conducted with difficulty to the tire side at a portion where the protective rubber layer 20 exists. However, when the bladder B has the thickness T1 at the portion corresponding to the surface fastener 10 and the thickness T1 is smaller than the thickness T2 at the surrounding portions, heat is preferably conducted through the bladder B at the portion of where the protective rubber layer 20 exists. Thereby, uniform curing is achieved.

Figure 7:
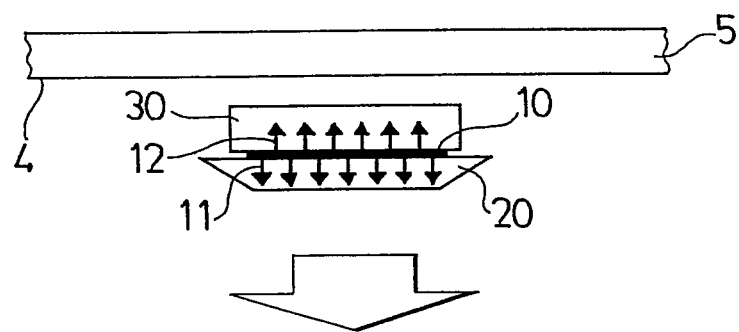
FIG. 7 is a cross-sectional view showing one example of the tire-meridian cross section of the portion around the surface fastener in the method of producing a pneumatic tire with a surface fastener according to the present invention.
Figure 7:
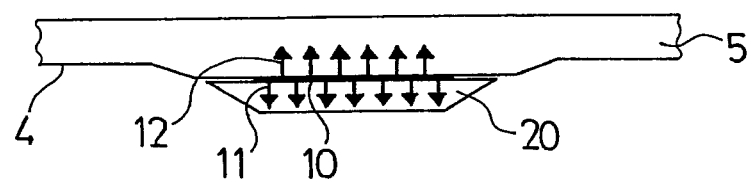

In FIG. 7, before a surface fastener 10 is placed on an uncured tire, a back-surface rubber layer 30 is pasted in advance on a surface of the surface fastener 10 opposite a surface having engagement elements. The back-surface rubber layer 30 is made of an uncured rubber identical to that of an inner liner layer 5 of the tire. More specifically, the back-surface rubber layer 30 is penetrated into by anchor elements 12 formed on the surface of the surface fastener 10 opposite the surface having the engagement elements. In this manner, a preliminary mold body is formed by integrating a protective rubber layer 20 and the back-surface rubber layer 30 with the surface fastener 10. By using this preliminary mold body, the pasting operation of the surface fastener 10 on the tire inner surface is facilitated.

Figure 8:
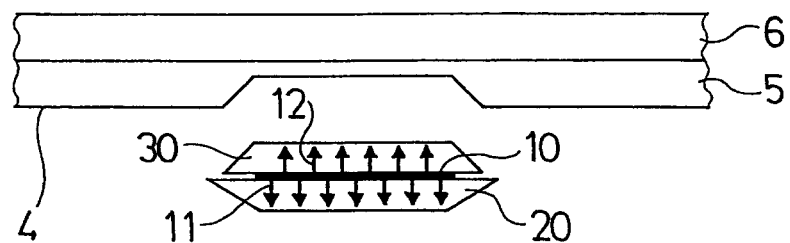
FIG. 8 is a cross-sectional view showing one example of the tire-meridian cross section of the portion around the surface fastener in the method of producing a pneumatic tire with a surface fastener according to the present invention.
Figure 9:
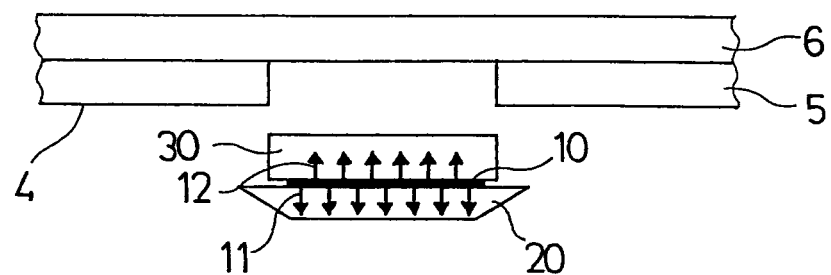
FIG. 9 is a cross-sectional view showing one example of the tire-meridian cross section of the portion around the surface fastener in the method of producing a pneumatic tire with a surface fastener according to the present invention.

The preliminary mold body of the surface fastener 10, the protective rubber layer 20 and the back-surface rubber layer 30 is advantageous in terms of the pasting operation, but disadvantageous in that the local thickness of the inner liner layer 5 including the back-surface rubber layer 30 is increased. For this reason, as shown in FIG. 8, in an uncured tire before the surface fastener 10 is placed, the thickness of an inner liner layer 5 to be stacked on a carcass layer 6 may be selectively reduced at a portion where the surface fastener 10 is placed. Alternatively, as shown in FIG. 9, in an uncured tire before the surface fastener 10 is placed, an inner liner layer 5 to be stacked on the carcass layer 6 may be selectively removed at the portion where the surface fastener 10 is placed. Thereby, even when the back-surface rubber layer 30 is stacked on the surface fastener 10, the thickness of the resultant inner liner layer 5 including the back-surface rubber layer 30 is leveled. Consequently, uniform curing of the tire is achieved.

Figure 10:
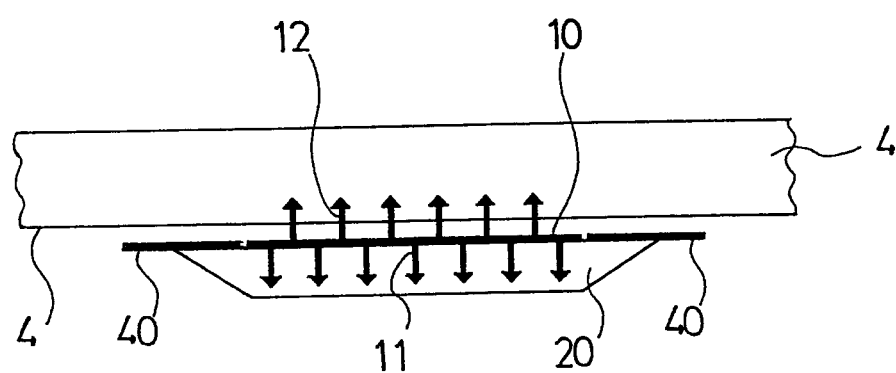
FIG. 10 is a cross-sectional view showing one example of the tire-meridian cross section of the portion around the surface fastener in the method of producing a pneumatic tire with a surface fastener according to the present invention.

In FIG. 10, releasing films 40 are pasted on regions of a surface, of a protective rubber layer 20, which is in contact with a surface fastener 10, the protective rubber layer 20 protruding from the surface fastener 10 in the region. If the protective rubber layer 20 is in direct contact with a tire inner surface 4, the protective rubber layer 20 after subjected to the curing process is integrally pasted on an inner liner layer 5 of the tire inner surface 4 in some cases. Nevertheless, by interposing the releasing films 40 between the protective rubber layer 20 and the tire inner surface 4, it is possible to prevent the protective rubber layer 20 and the inner liner layer 5 of the tire inner surface 4 from adhering to each other. Such releasing films 40 are effective when part of the protective rubber layer 20 having a trapezoid shape in the cross section protrudes from the surface fastener 10.

Figure 11:
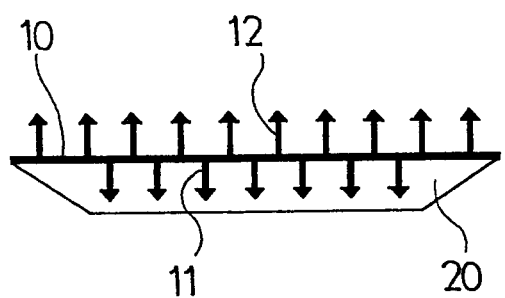
FIG. 11 is a cross-sectional view showing one example of the tire-meridian cross section of the portion around the surface fastener in the method of producing a pneumatic tire with a surface fastener according to the present invention.

Now, suppose a case where a surface fastener 10 has a region where engagement elements 11 are formed, the region being smaller than a region where anchor elements 12 are formed, as shown in FIG. 11. In this case, even when the protective rubber layer 20 having the trapezoid shape in the cross section is used, the protective rubber layer 20 does not protrude from the surface fastener 10; thus, the releasing films 40 do not have to be used.

Hereinabove, the preferable embodiments of the present invention have been described in detail. It should be understood, however, that various alternations, substitutions and replacements can be made on the above-described embodiments without departing from the spirit and scope of the present invention defined by the attached claims.

Example

Tires each having a surface fastener on the tire inner surface and having a tire size of 215/60R16 were manufactured in various manufacturing conditions. In Example, an uncured rubber was filled between engagement elements of the surface fastener to form a protective rubber layer in which the engagement elements were buried. Then, the surface fastener having the protective rubber layer was placed on an uncured tire in a manner that a surface of the surface fastener opposite a surface having the engagement elements was in intimate contact with the tire inner surface. After that, the uncured tire having the surface fastener was cured by a curing machine equipped with a bladder. The surface fastener was a surface fastener having anchor elements on the surface opposite the surface having the engagement elements. When the surface fastener was placed on the uncured tire, the anchor elements penetrated into the tire inner surface. In Conventional Example, a pneumatic tire with a surface fastener was manufactured in the same conditions as described above except that no protective rubber layer was used.

Evaluation was made on the engagement strength of each surface fastener of the pneumatic tires obtained by these two types of production method. As the engagement strength of each surface fastener, the "peel strength" according to JIS L3416 was measured and expressed by an index where that of Conventional Example was taken as 100. The larger the index value means the higher the engagement strength.

TABLE 1

|  | Conventional Example | Example |
| --- | --- | --- |
| Presence/absence of protective rubber layer | absent | present |
| Engagement strength (index) | 100 | 157 |

As shown in this Table 1, the surface fastener of the pneumatic tire obtained by the production method according to Example had a significantly higher engagement strength than that in Conventional Example.

What is claimed is:

1. A method of producing a pneumatic tire with a surface fastener characterized by comprising:
    filling an uncured rubber between engagement elements of a surface fastener to form a protective rubber layer in which the engagement elements are buried;
    placing the surface fastener having the protective rubber layer on an uncured tire in a manner that a surface of the surface fastener opposite a surface having the engagement elements is in intimate contact with an inner surface of the tire; and
    curing the uncured tire having the surface fastener by use of a curing machine equipped with a bladder,
    wherein the engagement elements comprise hook-like fastening elements.

2. The method of producing a pneumatic tire with a surface fastener according to claim 1, characterized in that,
    before the surface fastener is placed on the uncured tire, the protective rubber layer is cured in advance.

3. The method of producing a pneumatic tire with a surface fastener according to claim 1, characterized in that,
    the protective rubber layer has a trapezoid shape in a tire-meridian cross section, and
    the protective rubber layer has one surface which is in contact with the surface fastener, and which is larger than another surface opposite the one surface.

4. The method of producing a pneumatic tire with a surface fastener according to claim 1, characterized in that,
    the bladder which is inflated inside the uncured tire when the uncured tire is cured has one portion which corresponds to the surface fastener and which has a thickness smaller than another portion surrounding the one portion.

5. The method of producing a pneumatic tire with a surface fastener according to claim 1, characterized in that,
    a releasing film is pasted on a region of the surface, which is in contact with the surface fastener, of the protective rubber layer, the protective rubber layer protruding from the surface fastener in the region.

6. A method of producing a pneumatic tire with a surface fastener characterized by comprising:
    filling an uncured rubber between engagement elements of a surface fastener to form a protective rubber layer in which the engagement elements are buried;
    placing the surface fastener having the protective rubber layer on an uncured tire in a manner that a surface of the surface fastener opposite a surface having the engagement elements is in intimate contact with an inner surface of the tire; and
    curing the uncured tire having the surface fastener by use of a curing machine equipped with a bladder,
    wherein the surface fastener is a surface fastener having an anchor element on the surface opposite the surface having the engagement elements, and
    when the surface fastener is placed on the uncured tire, the anchor element penetrates into the tire inner surface.

7. A method of producing a pneumatic tire with a surface fastener characterized by comprising:
    filling an uncured rubber between engagement elements of a surface fastener to form a protective rubber layer in which the engagement elements are buried;
    placing the surface fastener having the protective rubber layer on an uncured tire in a manner that a surface of the surface fastener opposite a surface having the engagement elements is in intimate contact with an inner surface of the tire; and
    curing the uncured tire having the surface fastener by use of a curing machine equipped with a bladder,
    wherein before the surface fastener is placed on the uncured tire, a back-surface rubber layer is pasted in advance on the surface of the surface fastener opposite the surface having the engagement elements, the back-surface rubber layer being made of an uncured rubber identical to that of an inner liner layer of the tire.

8. The method of producing a pneumatic tire with a surface fastener according to claim 7, characterized in that, in the uncured tire before the surface fastener is placed, the inner liner layer is selectively thinned at a portion where the surface fastener is placed, or the inner liner layer is selectively removed at the portion where the surface fastener is placed.

* * * * *